United States Patent
Bohn et al.

(10) Patent No.: US 9,594,622 B2
(45) Date of Patent: Mar. 14, 2017

(54) CONTACTING REMOTE SUPPORT (CALL HOME) AND REPORTING A CATASTROPHIC EVENT WITH SUPPORTING DOCUMENTATION

(71) Applicant: International Business Machines Corporation, Armonk, NY (US)

(72) Inventors: Joseph A. Bohn, Durham, NC (US); Howard R. Davidson, Hudson, MA (US); Jose I. Ortiz, Raleigh, NC (US); Nicholas C. Schambureck, Madison, WI (US); Kristin R. Whetstone, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 14/613,802

(22) Filed: Feb. 4, 2015

(65) Prior Publication Data
US 2016/0224405 A1    Aug. 4, 2016

(51) Int. Cl.
*G06F 11/00* (2006.01)
*G06F 11/07* (2006.01)
*H04L 12/24* (2006.01)

(52) U.S. Cl.
CPC ...... *G06F 11/0793* (2013.01); *G06F 11/0709* (2013.01); *G06F 11/0751* (2013.01); *G06F 11/0772* (2013.01); *H04L 41/0604* (2013.01); *H04L 41/5074* (2013.01)

(58) Field of Classification Search
CPC ............. G06F 11/0709; G06F 11/0751; G06F 11/0772; G06F 11/0793; H04L 41/5074
See application file for complete search history.

(56) References Cited

U.S. PATENT DOCUMENTS

| | | | |
|---|---|---|---|
| 6,957,257 B1 * | 10/2005 | Buffalo | G06F 11/0748 709/200 |
| 7,259,666 B1 * | 8/2007 | Hermsmeyer | G06F 11/0709 340/517 |
| 8,060,782 B2 | 11/2011 | Caspi et al. | |
| 8,892,518 B1 * | 11/2014 | Kannan | G06F 11/0709 707/631 |
| 2006/0233311 A1 * | 10/2006 | Adams | H04L 12/2697 379/21 |
| 2007/0061180 A1 * | 3/2007 | Offenberg | G06Q 10/06312 705/7.22 |

(Continued)

FOREIGN PATENT DOCUMENTS

WO    WO0065448    11/2000

*Primary Examiner* — Joshua P Lottich (74) *Attorney, Agent, or Firm* — Scully, Scott, Murphy & Presser, P.C.; Nicholas Bowman (57) ABSTRACT

Responsive to detecting a failure in a computer system determined by receiving a trap from at least one component integrated in the computer system, a notification to a recipient may be transmitted. A service ticket is created associated with the failure. One or more other problem events occurring during the failure is detected and an indication that the other problem events occurred during the failure is recorded. Notifying the recipient during the failure, of the one or more other problem events, is prevented. Responsive to detecting a resolution of the failure, the service ticket is updated with the other problem events with the indication that the other problem event occurred during the failure.

18 Claims, 3 Drawing Sheets

(56) References Cited

U.S. PATENT DOCUMENTS

| | | | |
|---|---|---|---|
| 2007/0185913 A1* | 8/2007 | Reichert | G06F 11/3447 |
| 2009/0049133 A1* | 2/2009 | Odom | G06Q 10/10 |
| | | | 709/206 |
| 2013/0051239 A1 | 2/2013 | Meredith et al. | |
| 2013/0204650 A1* | 8/2013 | Sabharwal | G06Q 30/016 |
| | | | 705/7.13 |
| 2013/0227103 A1* | 8/2013 | Garimella | H04L 41/5054 |
| | | | 709/223 |
| 2014/0075008 A1* | 3/2014 | Douglas | G06F 11/0709 |
| | | | 709/224 |
| 2014/0122140 A1* | 5/2014 | Rijnders | G06Q 30/01 |
| | | | 705/7.13 |
| 2014/0195670 A1* | 7/2014 | Jain | H04L 41/069 |
| | | | 709/224 |
| 2014/0257883 A1* | 9/2014 | Thompson | G06Q 10/02 |
| | | | 705/5 |
| 2014/0372805 A1* | 12/2014 | Rijnders | G06F 11/0793 |
| | | | 714/37 |

* cited by examiner

CONTACTING REMOTE SUPPORT (CALL HOME) AND REPORTING A CATASTROPHIC EVENT WITH SUPPORTING DOCUMENTATION

FIELD

The present application relates generally to computers and computer applications, and more particularly to problem detection and notification in computer systems.

BACKGROUND

The present disclosure in one aspect addresses the problem of what to do when an internal error occurs on a management server that is configured to automatically send problem reports to a call home support team. For example, the inventors in the present application have recognized that a call home support team should not be flooded with false service tickets or service tickets that do not have enough information to be useable, but instead the call home support team should be made aware that an internal error (e.g., a major error) has occurred and for example be provided with a summary or like information regarding any additional problems that occur during the outage.

BRIEF SUMMARY

A method and system of notifying problems occurring in a computer system may be provided. The method, in one aspect, may comprise transmitting a notification to a recipient, responsive to detecting a failure in a computer system determined by receiving a trap from at least one component integrated in the computer system. The method may further comprise creating a service ticket associated with the failure. The method may further comprise detecting one or more other problem events occurring during the failure and recording with an indication that the other problem events occurred during the failure. The method may further comprise preventing notifying the recipient during the failure, of the one or more other problem events. The method may further comprise responsive to detecting a resolution of the failure, updating the service ticket with the other problem events with the indication that the other problem event occurred during the failure.

A system of providing a computer problem notification, in one aspect, may comprise a memory device and a processor operable to detect a failure in a computing system by receiving a trap from at least one component integrated in a computer system. The processor may be further operable to transmit a notification to a recipient. The processor may be further operable to create a service ticket associated with the failure. The processor may be further operable to detect one or more other problem events occurring during the failure. The processor may be further operable to record an indication that the other problem events occurred during the failure on the memory device. The processor may be further operable to prevent notifying the recipient during the failure, of the one or more other problem events. Responsive to detecting a resolution of the failure, the processor may be further operable to update the service ticket with the other problem events with the indication that the other problem event occurred during the failure.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Techniques are disclosed for providing notification of computer system failure. A methodology in the present disclosure may provide a notification for only a major error event to a remote support team/external monitoring solutions upon detecting a failure in a computing system or server. In one aspect, a notification of only the occurrence of a major event or failure is sent to a remote support team or the like. Additional events that occur with the major event or failure are stored in a local storage, for example, with a tag to indicate their occurrence during the major error or failure event. An updated notification of the failure and the additional events with their tags may be sent to the remote support team or the like after the major failure is resolved.

For example, a methodology in one embodiment of the present disclosure may include a process of detecting that a major error has occurred, creating a single service ticket to alert a remote support team (e.g., a service provider's support team), for example, through a call home signal that a major error has occurred, forwarding the major error event to one or more external monitoring solutions, and storing additional events until it is detected that the major error has been resolved. Once the major error has been resolved, the stored events may be processed and tagged as occurring during the major error so that support teams can determine the validity of the events. This process is useful to the support as well as the customer since they are able to focus on one critical cause of a major situation instead of being flooded with issues that flow from a common root cause. The subsequent review of problems that happened during the crisis may ensure that problems reported during the situation can be fixed properly.

Figure 1:
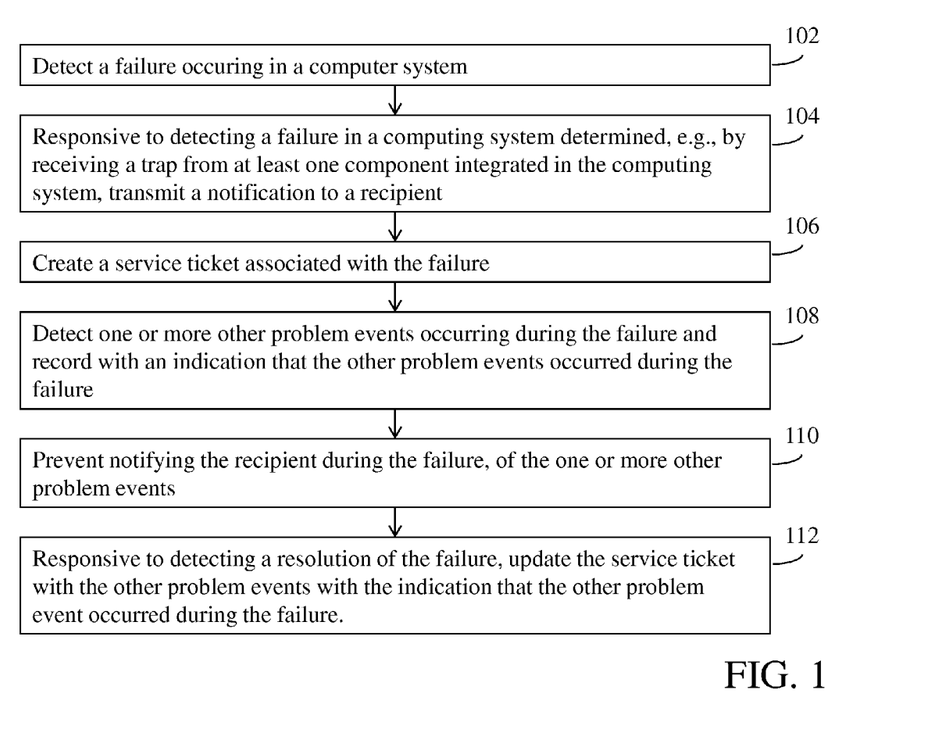
FIG. 1 is a method of providing computer problem notification in one embodiment of the present disclosure.

FIG. 1 is a method of providing computer problem notification in one embodiment of the present disclosure. At 102, a failure in a computer system may be detected. For example, a catastrophic event may have occurred that prevents computer or management functions from operating such as the database becoming unavailable. An event refers to an action or occurrence detected by the computer system, which may be reported to the user or external management solutions.

Event forwarding refers to an action of sending event information to an external source asynchronously. A problem, for example, may be a type of event (e.g., a severe type of event) that requires a user's attention and/or a service call. Examples of problems may include but are not limited to a database failure, a broken server, and others. The computer system may be a consolidated appliance solution providing infrastructure, middleware, and application capabilities to a customer. The computer system, for example, may include an event management system that receives traps from the hardware and software components that make up the computer system. As an example, the computer system may notice that the database is down and attempts to restart it. If an attempt to restore or fix the failure fails, a call home event is created stating that the database is down. A call home event is a type of event that results in problem creation. When the database is back up, the computer system creates another event stating that the database is back up. In one embodiment of the present disclosure, in the time between those two events, the processing shown at 104, 106 and 108 may happen.

In one aspect, only a specific type of failure may be eligible for the following processing. For example, failures considered to be of severe types may be candidates for the following processing. For example, the trap from the hardware or software component includes information on the severity of the trap. A trap meeting a threshold severity may be considered as candidates. In another aspect, a predefined list of computer system failures may be made available.

At 104, responsive to detecting a failure in a computing system, for example, determined by receiving a trap or an exception signal from at least one component integrated in the computer system, a notification is transmitted to a recipient processor. A recipient may be a system provider, for example, a company or organization that provides and supports the computer system. A recipient processor may be a processing system associated with such system provider. The notification may be in the form of a call home event.

At 106, a service ticket associated with the failure is created. For example, a service ticket is created automatically through the call home process for the original failure event, for instance, a database down event. For instance, a service ticket is created responsive to receiving the failure notification. A service ticket refers to an actionable help request that may be submitted to a system provider. A service ticket, for example, includes a bug report, or information regarding the failure, that needs attention from a service provider. In the present disclosure in one embodiment, this service ticket states the original failure, for example, that the database is down and that subsequent service tickets will not be created until the failure is fixed, for instance, the failed database is back up. A specific set of logs may be collected, associated with the service ticket, and uploaded to the recipient processor or the system provider. For example, logs of the computer system associated with the failed component may be collected and transmitted to the system provider.

At 108, one or more other problem events occurring during the failure may be detected and recorded with an indication that the other problem events occurred during the failure. During the period of time in which the computer system is running under the detected failure, notifying of the recipient of the one or more other problem events occurring during that period of the failure is prevented. For example, all events received during the detected failure, for example, while the failure is maintained in the computer system (e.g., database is down) are saved in their original format in individual files on a file system (e.g., associated with the computer system). The individual files are referred to as event files, for example, there may be one event file created per event. In another aspect, one event file may consolidate all events. An additional parameter may be added to the event file that indicates the problem events were created during the detected failure, for instance, while the database was down. An event or an event file is part of a local alert system. In one aspect, these event files are stored locally and on the backup partition associated with the computer system. The service ticket number and Uniform Resource Locator (URL) associated with the original failure event, for example, database down call home event, are added to the event file.

In one aspect, if event forwarding is enabled and configured, the call home event is forwarded to an external monitoring solution such as Netcool®/OMNIbus from International Business Machines Corporation (IBM)®, Armonk, N.Y., in addition to sending a notification to the service provider.

At 110, notifying the recipient, for example, the service provider or the service provider's processor, of the one or more other problem events occurring during the failure is prevented during the period of time of the failure remains or is maintained in the computer system. For instance, other problem events that occur during the outage are not sent to the service provider.

In one embodiment, the service ticket created for the original failure (e.g., at 106) is updated with a list of all the events that occurred while the original failure was not resolved. At 112, responsive to detecting a resolution of the failure (original failure), the service ticket is updated. The updated service ticket describes at least the failure and the other problem events with the indication that the other problem event occurred during the failure. For example, when the computer system creates the event that the database is back up, the other problem events that occurred during the detected failure may be loaded and sent to the system provider and one or more external monitoring systems in the order that they were previously received or detected. Since these files have been saved in their original format, it appears to the system provider that these events are coming from their original source hardware or software components, with the added original failure flag, for example, database down flag. Original timestamps are preserved to capture the true timing of the events.

In one embodiment, a new service ticket generally is not created for the other problem events that occurred during the original failure; Rather, the service ticket created for the original failure is updated with information regarding those other problem events. For example, at 112, once the original failure (e.g., database down) has been resolved, the event files may be processed in the order that they were received or occurred. While most of these events will not trigger new service tickets to be created, in one embodiment, if the events are severe enough (for example, an event that occurred while the original failure is unresolved also has a severity attribute that meets a threshold severity), a service ticket may be created with additional information in the service ticket description stating that this event occurred during the original failure (database down) and may be related to that failure rather than its own unique problem.

The events and problems created from the stored event files have a parameter that states they were created while the failure occurred, for example, database was down. All service tickets created from these events include a message stating that they were thrown while the failure occurred, for example, database was down. Users and the system provider may then determine whether the events are actionable errors or if they were caused due to the original failure, for example, database failing. After all events are processed, a list of all of the events that occurred while the failure occurred, for example, database was down, is collected and attached to the original service ticket. Once the failure noted in the service ticket is resolved, the service ticket may be closed by the service provider. The list of events attached to it may be used for future reference. For example, if multiple customers have the same error (e.g., database down) then the lists can be compared to determine which events are common to the database being down, for example, so that service tickets can be closed more efficiently the next time that this error occurs.

Figure 2:
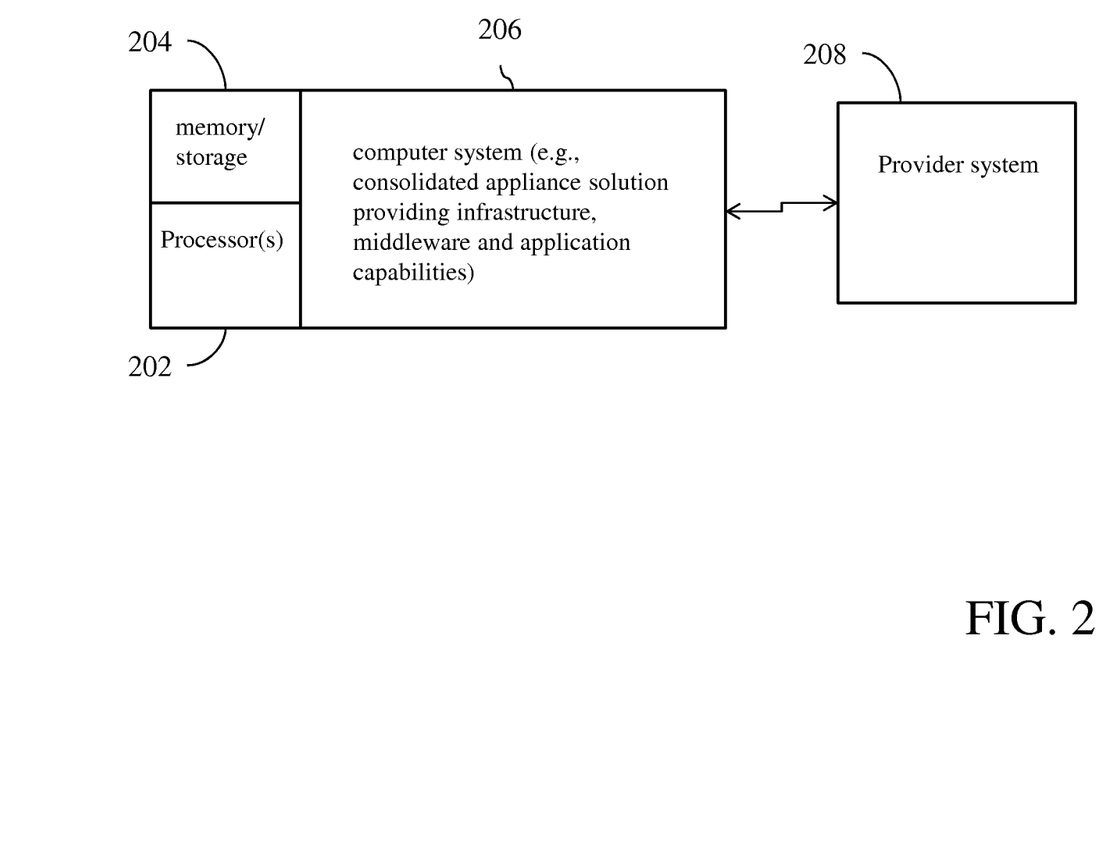
FIG. 2 is a diagram illustrating components of the present disclosure in one embodiment.

FIG. 2 is a diagram illustrating components of the present disclosure in one embodiment. A computer system 206, for example, comprises a consolidated appliance solution that includes infrastructure, middleware, and application capabilities, for example, provided to a customer, for example, by a system provider 208. The computer system 206 may include one or more processors 202 that detect an error or failure that occurs in the computer system 206, for example, one or more of its components. For example, a processor 202 may detect a failure in a computing system by receiving a trap from at least one component integrated in a computer system. The processor 202 may transmit a notification to a recipient, for example, the provider system, that the failure has occurred. The notification may include forwarding a call home event to the system provider 208. The processor 202 may further create a service ticket associated with the failure.

While the computer system 206 is running under the failed condition (detected failure), the processor 202 may also detect one or more other problem events occurring during the failure in the computer system 206. The processor 202 may record those one or more other problem events, for example, store in memory or storage device 204 associated with the computer 206, with an indication that the other problem events occurred during the failure, that is, while the computer system 206 was still under the failure condition. The processor may not notify the recipient, e.g., the provider system 208, of the occurrence of those one or more other problem events, and prevent another component of the computer system 206 from notifying the provider system 208, while the computer system 206 is running under the failure condition.

During the failed condition, the processor 202 may update the service ticket with the one or more other problem events detected during that period. The one or more other problem events are recorded in an original format with their original timestamp of when they occurred, and stored on the memory device 204. Responsive to detecting a resolution of the failure, the processor 202 may send an updated service ticket describing at least the failure and the other problem events with the indication that the other problem event occurred during the failure.

A methodology disclosed herein in one aspect surfaces critical information that may influence the response and activities of the remote service team to the problems that occurred during the major incident. Once the environment has recovered from the major incident, the methodology of the present disclosure in one embodiment assists the remote service team in determining root cause for a number of events that were by products of the major incident without masking actual events that happened to coincide with the major incident.

In one aspect, a methodology of the present disclosure stores additional events in a local storage with a tag and sends the updated notification and the additional events with their tags to the remote support team. The methodology in one aspect may function to provide alerts that a major error has occurred and store any additional errors until the original issue is resolved. Once the original issue has been resolved, the methodology includes tagging service tickets that may be related and adding the list of events that occurred during the outage to the original service ticket. In one aspect, the methodology the present disclosure may include the notion of situations where the events cannot be generated and sent because of a more significant outage. After the major error is resolved and new service tickets for the events that occurred during this outage are created and tagged, a support can determine the validity and/or priority of the new service tickets.

Figure 3:
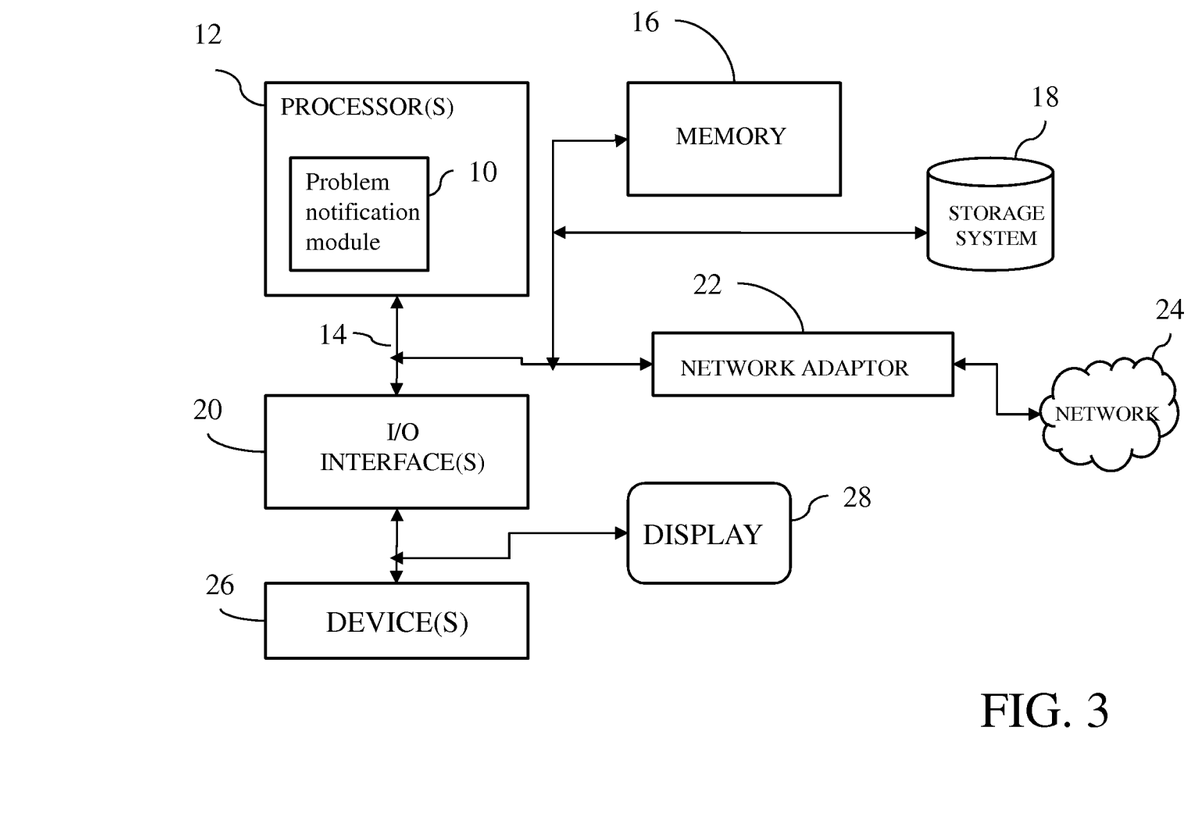
FIG. 3 illustrates a schematic of an example computer or processing system that may implement a computer system problem notification system in one embodiment of the present disclosure.

FIG. 3 illustrates a schematic of an example computer or processing system that may implement a computer system problem notification system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a problem notification module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of computer problem notification, comprising:
    responsive to detecting a failure in a computer system determined by receiving a trap from at least one component integrated in the computer system, transmitting a notification to a recipient;
    creating a service ticket associated with the failure;
    detecting one or more other problem events occurring during the failure and recording with an indication that the other problem events occurred during the failure;
    preventing notifying the recipient during the failure, of the one or more other problem events; and
    responsive to detecting a resolution of the failure, updating the service ticket with the other problem events with the indication that the other problem event occurred during the failure.

2. The method of claim 1, wherein the recipient comprises a processing component associated with a provider of the computer system.

3. The method of claim 1, wherein the computer system comprises a consolidated appliance solution.

4. The method of claim 3, wherein the consolidated appliance solution comprises infrastructure, middleware, and application capabilities.

5. The method of claim 1, wherein the notification comprises a call home event.

6. The method of claim 1, wherein the recording comprises recording the one or more other problem events in an original format and sending the updated service ticket includes sending the updated service ticket including original timestamp of the one or more other problem events.

7. A system of providing a computer problem notification, comprising:
    a memory device; and
    a processor operable to detect a failure in a computing system by receiving a trap from at least one component integrated in a computer system,
    the processor further operable to transmit a notification to a recipient,
    the processor further operable to create a service ticket associated with the failure,
    the processor further operable to detect one or more other problem events occurring during the failure,
    the processor further operable to record an indication that the other problem events occurred during the failure on the memory device,
    the processor further operable to prevent notifying the recipient during the failure, of the one or more other problem events, and
    responsive to detecting a resolution of the failure, the processor further operable to update the service ticket with the other problem events with the indication that the other problem event occurred during the failure.

8. The system of claim 7, wherein the recipient comprises a processing component associated with a provider of the computer system.

9. The system of claim 7, wherein the computer system comprises a consolidated appliance solution.

10. The system of claim 9, wherein the consolidated appliance solution comprises infrastructure, middleware, and application capabilities.

11. The system of claim 7, wherein the notification comprises a call home event.

12. The system of claim 7, wherein the processor is operable to record the one or more other problem events in an original format on the memory device and send the updated service ticket including original timestamp of the one or more other problem events.

13. A non-transitory computer readable storage medium storing a program of instructions executable by a machine to perform a method of computer problem notification, the method comprising:
    responsive to detecting a failure in a computer system determined by receiving a trap from at least one component integrated in the computer system, transmitting a notification to a recipient;
    creating a service ticket associated with the failure;

detecting one or more other problem events occurring during the failure and recording with an indication that the other problem events occurred during the failure;

preventing notifying the recipient during the failure, of the one or more other problem events; and responsive to detecting a resolution of the failure, updating the service ticket with the other problem events with the indication that the other problem event occurred during the failure.

14. The non-transitory computer readable storage medium of claim 13, wherein the recipient comprises a processing component associated with a provider of the computer system.

15. The non-transitory computer readable storage medium of claim 13, wherein the computer system comprises a consolidated appliance solution.

16. The non-transitory computer readable storage medium of claim 15, wherein the consolidated appliance solution comprises infrastructure, middleware, and application capabilities.

17. The non-transitory computer readable storage medium of claim 13, wherein the notification comprises a call home event.

18. The non-transitory computer readable storage medium of claim 13, wherein the recording comprises recording the one or more other problem events in an original format and sending the updated service ticket includes sending the updated service ticket including original timestamp of the one or more other problem events.

* * * * *